US006526446B1

United States Patent
Yang et al.

(10) Patent No.: US 6,526,446 B1
(45) Date of Patent: Feb. 25, 2003

(54) HARDWARE ONLY TRANSMISSION CONTROL PROTOCOL SEGMENTATION FOR A HIGH PERFORMANCE NETWORK INTERFACE CARD

(75) Inventors: Li-Jau Yang, San Jose, CA (US); Rich Traber, Fremont, CA (US); Chi-Le Wang, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/300,537

(22) Filed: Apr. 27, 1999

(51) Int. Cl.[7] ............................................. G06F 15/16
(52) U.S. Cl. ...................................... 709/230; 709/250
(58) Field of Search ................................. 709/230, 250, 709/203; 370/389

(56) References Cited

U.S. PATENT DOCUMENTS

| | | | | |
|---|---|---|---|---|
| 5,937,169 A | * | 8/1999 | Connery et al. | 709/250 |
| 6,247,060 B1 | * | 6/2001 | Boucher et al. | 709/230 |
| 6,334,153 B2 | * | 12/2001 | Boucher et al. | 709/230 |
| 6,370,599 B1 | * | 4/2002 | Anand et al. | 709/203 |
| 6,373,841 B1 | * | 4/2002 | Goh et al. | 370/389 |
| 6,389,479 B1 | * | 5/2002 | Boucher et al. | 709/230 |
| 6,427,171 B1 | * | 7/2002 | Craft et al. | 709/230 |
| 6,427,173 B1 | * | 7/2002 | Boucher et al. | 709/230 |
| 6,434,620 B1 | * | 8/2002 | Boucher et al. | 709/230 |
| 2001/0023460 A1 | * | 9/2001 | Boucher et al. | 709/250 |
| 2001/0027496 A1 | * | 10/2001 | Boucher et al. | 709/250 |
| 2002/0087732 A1 | * | 7/2002 | Boucher et al. | 709/250 |

OTHER PUBLICATIONS

Kalampoukas, Lampros, Varma, Anujan, Ramakrishnan. K. K., "Explicit Window Adaptation: A method to enhance TCP Performance" Jun. 2002, IEEE/ACM Transactions on Networking, vol. 10, No. 3. pp. 338–350.*
Mellia Marco, Meo Michela, Casetti Claudio, "TCP Smart-Framing: Using smart segment to enhance the performance of TCP" Sep. 2001, IEEE.*
Bilic Hrvoje, Birk Yitzhak, Chirashnya Igor, Machulshy Zorik, "Deferred Segmentation for Wire–Speed Transmission of Large TCP Frames over Standard GbE Networks" Mar. 2001, IEEE.*

* cited by examiner

Primary Examiner—Zarni Maung
Assistant Examiner—Kimberly Flynn
(74) Attorney, Agent, or Firm—Wagner Murabito & Hao LLP (57) ABSTRACT

Hardware only transmission control protocol segmentation for a high performance network interface card. Specifically, one embodiment of the present invention includes a circuit for implementing transmission control protocol (TCP) segmentation. The circuit includes a segmentation circuit coupled to receive a descriptor from a host device which corresponds to data. The segmentation circuit utilizes the descriptor to generate other descriptors that describe each frame segment. Furthermore, the circuit also includes a data download circuit coupled to the segmentation circuit to receive the frame segment descriptors. Specifically, the data download circuit retrieves the data from a memory. Moreover, the circuit includes a medium access control circuit coupled to the data download circuit to receive the data in a frame segment.

33 Claims, 5 Drawing Sheets

HARDWARE ONLY TRANSMISSION CONTROL PROTOCOL SEGMENTATION FOR A HIGH PERFORMANCE NETWORK INTERFACE CARD

TECHNICAL FIELD

The present invention generally relates to the field of computer networking. More particularly, the present invention relates to the field of transmission control protocol (TCP) segmentation for a network interface card.

BACKGROUND ART

Computers have become an integral tool used in a wide variety of different applications, such as in finance and commercial transactions, computer-aided design and manufacturing, health care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via electronic mail (e-mail) and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

Typically, NICs are also used to communicate over a LAN communications network standard referred to as Ethernet. When large amounts of data or data files are transmitted using Ethernet, a Transmission Control Protocol (TCP) segmentation process is typically run on a central processor unit (CPU) of a host computer in order to break the data down into transmission frames. For example, Ethernet has a maximum transmission frame size of 1514 bytes. Of the 1514 bytes of the transmission frame, there are a lot of bytes which are used for overhead. For instance, some bytes are used for addressing, other bytes are used for header information, etc. As such, the bytes remaining for the actual payload of data within each transmission frame are considerably less (e.g., 1460 bytes) than the 1514 bytes. It should be appreciated that there are disadvantages associated with this prior art process of segmenting data for transmission over a network.

One of the main disadvantages of this prior art segmentation process occurs as Ethernet network speed becomes ever faster (e.g., gigabit levels). At these high network speeds, the TCP segmentation process performed by the processor of the host computer becomes a bottleneck of the critical performance path, thereby slowing down the data throughput of the NIC. In other words, the processor becomes a bottleneck for data throughput of the NIC when used at high network speeds.

One of the prior art solutions for improving the throughput of the NIC is to implement an embedded processor onto the NIC in order to specifically perform the TCP segmentation process. In this manner, a large majority of the segmentation process is removed from the processor of the host computer and moved onto the embedded processor of the NIC. This prior art solution does improve the throughput of the NIC, but there are disadvantages associated with this prior art solution.

One of the main disadvantages of this prior art,solution is that it does not effectively solve the problem of data throughput of a NIC when used with high speed networks (e.g., gigabit levels). Basically, the embedded processor of the NIC now becomes the bottleneck of the critical performance path thereby slowing down the data throughput of the NIC. In other words, the bottleneck for data throughput of the NIC is moved from the host processor to the processor of the NIC.

Accordingly, a need exists for a method and system for providing significantly improved data throughput of a network interface card which is used with a high speed network (e.g., gigabit levels).

DISCLOSURE OF THE INVENTION

The present invention provides a method and system for providing significantly improved data throughput of a network connection which is used with a high speed network (e.g., gigabit levels). Specifically, one embodiment of the present invention includes a circuit for implementing transmission control protocol (TCP) segmentation. The circuit includes a segmentation circuit coupled to receive a descriptor from a host device which corresponds to data. The segmentation circuit utilizes the descriptor to generate other descriptors that describe each frame segment. Furthermore, the circuit also includes a data download circuit coupled to the segmentation circuit to receive the frame segment descriptors. Specifically, the data download circuit retrieves the data from a memory. Moreover, the circuit includes a medium access control circuit coupled to the data download circuit to receive the data in a frame segment.

In another embodiment, the present invention includes a system for implementing transmission control protocol segmentation. The system includes a host device that includes a host driver for preparing a first signal and a host memory. Furthermore, the system includes a circuit for implementing transmission control protocol segmentation. The circuit includes a retriever circuit coupled to receive the first signal from the host device which indicates where a descriptor is located within the host memory. The retriever circuit also retrieves the descriptor which describes data stored within the host memory. The circuit also includes a segmentation circuit coupled to the retriever circuit to receive the descriptor. Specifically, the segmentation circuit utilizes the descriptor to generate a frame segment descriptor. Moreover, the circuit includes a data download circuit coupled to the segmentation circuit to receive the frame segment descriptor. The data download circuit retrieves the data from the host memory. Additionally, the circuit includes a medium access control circuit coupled to the data download circuit to receive the data in a frame segment.

In still another embodiment, the present invention includes a method for implementing transmission control protocol segmentation within hardware. The method includes the step of receiving from a host device a descriptor signal which corresponds to data stored within memory. Moreover, the method includes the step of using the descriptor signal to generate a frame segment descriptor using a segmentation circuit. Furthermore, the method also includes the step of receiving the data from the memory using a data download circuit.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "using", "transmitting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 1:
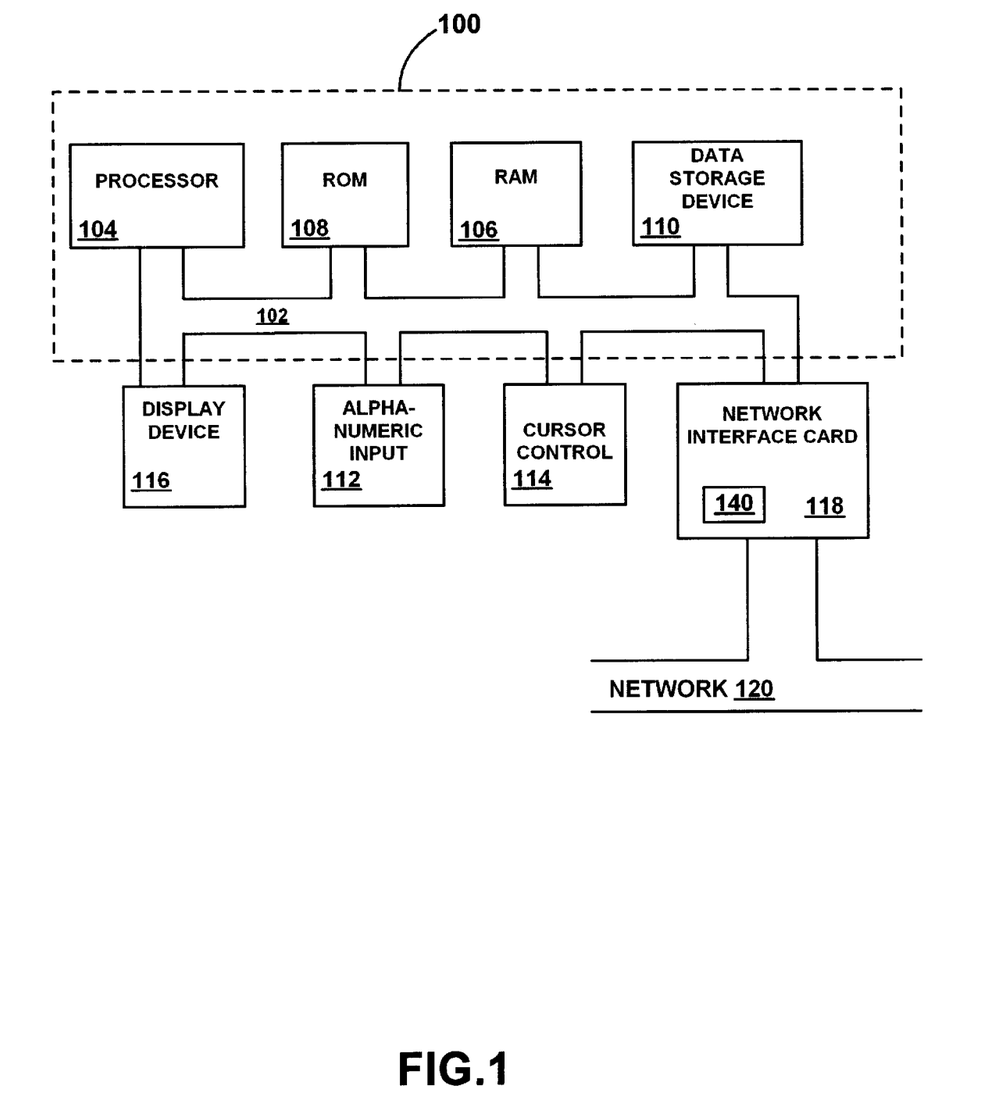
FIG. 1 is a schematic diagram of an exemplary computer system used to perform steps of the present method in accordance with one embodiment of the present invention.

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is exemplary only and that the present invention can operate within a number of different computer systems including general purpose networked computer systems, embedded computer systems, and stand alone computer systems. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80×86-family microprocessor or any other type of processor. System 100 also includes data storage features such as a computer usable volatile memory 106, e.g., random access memory (RAM), coupled to bus 102 for storing information and instructions for central processor unit 104, computer usable non-volatile memory 108, e.g., read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112, which includes alphanumeric and function keys, is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a mouse, trackball, touch pad, joystick or special keys on alphanumeric input device 112 capable of signaling movement of a given direction or manner of displacement. Alternatively, it is appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

With reference still to FIG. 1, significantly, a network interface card (NIC) 118 coupled to bus 102 is connected to a network 120 and controls the flow of information of computer system 100 over network 120. Data packets, such as Ethernet packets, that are incoming and outgoing via network 120 are transmitted and received by a Medium Access Control (MAC) circuit 140 of NIC 118. A more detailed discussion of NIC 118 in furtherance of the present invention is found below.

DETAILED DESCRIPTION OF THE STRUCTURE AND OPERATION OF THE PRESENT INVENTION

Figure 2:
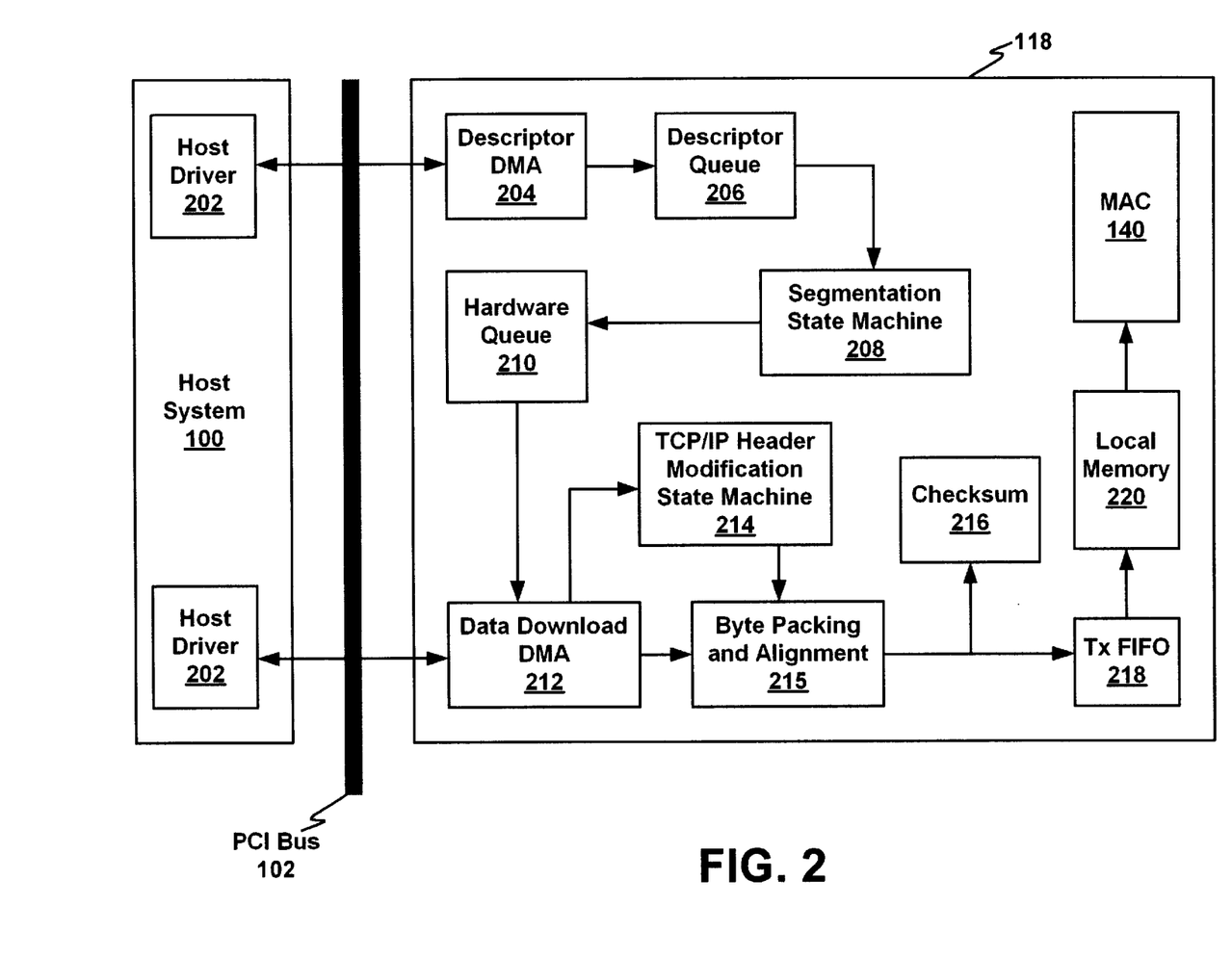
FIG. 2 is a schematic diagram of a network interface card, in accordance with one embodiment of the present invention, coupled to a host computer system.

With reference now to FIG. 2, a schematic diagram of a host computer system 100 having a network interface card 118 coupled thereto is shown. One of the main purposes of the different hardware components of network interface card 118, of the present embodiment, is to perform all of the transmission control protocol (TCP) segmentation process. In this manner, the segmentation process is removed from processor 104 of computer system 100, thereby significantly reducing its segmentation process utilization and allowing processor 104 to be utilized for other processes. Furthermore, in this fashion, the data throughput of network interface card 118 is able to function at high wire speeds (e.g., gigabit levels).

In the following description of embodiments of the present invention, the network interface card is a peripheral component. Although the present embodiments specifically recite a network interface card, the present invention is also well suited to an embodiment employing various other peripheral components. That is, the present invention is well suited to an embodiment in which the peripheral component is, for example, a PCMCIA (personal computer memory card international association) card. Similarly, the present invention is well suited to an embodiment in which the peripheral component is, for example, a compact form factor I/O (input/output) card. Additionally, the present invention is well suited to use in an embodiment in which the peripheral component is, for example, a rate controller, a small computer system interface (SCSI) controller, a graphics card, and the like. Furthermore, the present invention is well suited to be use, for example, in a non-peripheral component environment such as an application specific integrated circuit (ASIC) disposed on a motherboard, an embedded circuit, and the like.

Referring to FIG. 2, a host driver 202 running on processor 106 of host system 100 is responsible for creating a descriptor for a data file stored within host memory 106 which is to be eventually transferred by network interface card (NIC) 118 over network 120. The descriptor includes information about where the data file is stored within host memory 106, the size of the data file, along with other information. Furthermore, host driver 202 prepares a list of these descriptors and makes them available to a descriptor direct memory access (DMA) circuit 204 by updating a write pointer register (not shown). In the present embodiment, the descriptor DMA 204 is used by NIC 118 to access the descriptors created by host software. In accordance with the present embodiment, other methods may be used as well to access the descriptors. It is appreciated that descriptor DMA circuit 204, which is located on NIC 118, is coupled to Peripheral Component Interconnect (PCI) bus 102. It should be appreciated that bus 102 of the present embodiment can be any type of communication bus and is not limited to being a PCI bus.

More specifically, the descriptor structure prepared by host driver 202 consists of control words, fragment address, and fragment length. The control words contain packet related information and flags. It should be appreciated that the packet information and flags are well known by those of ordinary skill in the art.

It should be further appreciated that host driver 202 of FIG. 2 can make a request to protocol not to support Transmission Control Protocol/Internet Protocol (TCP/IP) options. In this case, the length of IP and TCP headers in the present embodiment are fixed at 20 bytes each. Based on this, the descriptor will assume a format having a field of one or more control words, followed by a descriptor address field which is followed by a descriptor length field.

Referring still to FIG. 2, descriptor download DMA circuit 204 retrieves the descriptors located within host memory 106. Specifically, once descriptor download DMA circuit 204 detects a difference between its read pointer and the software controlled write pointer, it initiates bus master DMA operation to download all of the available descriptors located in host memory 106 over PCI bus 102. It is appreciated that descriptor download DMA circuit 204 is coupled to a descriptor queue 206. Upon retrieving the descriptors from host memory 106, descriptor download DMA circuit 204 transmits them to descriptor queue 206 to be temporarily stored. It should be appreciated that descriptor queue 206 of the present embodiment is a first-in-first-out (FIFO) memory device. Furthermore, descriptor queue 206 is coupled to a TCP segmentation state machine 208. Moreover, descriptor queue 206 serves an empty flag along with the stored descriptors to TCP segmentation state machine 208.

Upon receiving the descriptors, TCP segmentation state machine 208 of the present embodiment determines if the data file (payload) corresponding to the descriptors stored within host memory 106 needs to be TCP segmented into Ether frames. If the data file does not need TCP segmentation, TCP segmentation state machine 208 reconstructs the received descriptors into a format defined for a hardware queue 210. Conversely, if the data file needs TCP segmentation, TCP segmentation state machine 208 creates another set of descriptors wherein each descriptor describes a fragment or a segment of the data file. In other words, the data file stored within host memory 106 is virtually segmented down into a number of frames. Within the present embodiment, each of the descriptors created by TCP segmentation state machine 208 is going to contain a pointer to a location in host memory 106 where a reusable "template" for the IP header is stored. Furthermore, each descriptors is also going to contain a pointer to a location in host memory 106 where a reusable "template" for the TCP header is stored. Additionally, each of the descriptors would also include a control word along with pointers to where the data file (payload) is stored within host memory 106. Also, each descriptor contains a pointer to a location in host memory 106 where a reusable template for the Medium Access Control (MAC) header is stored. These descriptors are then transmitted by TCP segmentation state machine 208 to hardware queue 210 for temporary storage. It should be appreciated that the templates for the TCP, IP, and frame headers are created by host driver 202 and are used for every segment. It should be further appreciated that the present embodiment is well suited to operate without the templates described above.

More specifically, upon receiving the descriptors, TCP segmentation state machine 208 of FIG. 2 extracts the control fields from the descriptors. If TCP segmentation is not needed, TCP segmentation state machine 208 reconstructs the descriptors into a format defined for a data download DMA circuit 212. It is appreciated that TCP segmentation state machine 208 is coupled to hardware queue 210. As such, TCP segmentation state machine 208 transmits the revised structure descriptors to hardware queue 210 where they are temporarily stored. This revised structure descriptor information stored within hardware queue 210 will subsequently be used by data download DMA circuit 212 to transfer data. If TCP segmentation is needed, TCP segmentation state machine 208 examines certain fields in the header and each fragment length, and performs TCP segmentation. The results are stored into hardware queue 210, as described above. It should be appreciated that if there are more than one data descriptor in the current TCP segment and one or more of them has a length of less that the maximum segment size (MSS), TCP segmentation state machine 208 of the present embodiment will combine these descriptors into one Ether frame, but not to exceed the MSS. This process is performed in order to achieve high efficiency and high performance. Furthermore, TCP segmentation state machine 208 of the present embodiment will not make the descriptors visible to data download DMA circuit 212 unless it constitutes a complete Ether frame, or any other type of transmission frame.

Furthermore, TCP segmentation state machine 208 of FIG. 2 also saves the following information into the descriptor structure (not shown) of hardware queue 210 for later use by a TCP/IP header modification state machine 214. Specifically, TCP segmentation state machine 208 stores a totalLength[15:0] which includes information for the field of Total_Length in the IP header. The totalLength is a summation of the length of the payload, the length of the IP header, and the length of the TCP header. It should be appreciated that the totalLength excludes the Medium Access Control (MAC) header. TCP segmentation state machine 208 also stores a dontFragment which includes information for the field of Flags in the IP header. It should be appreciated that the dontFragment has to be set all the time. TCP segmentation state machine 208 also stores a sequenceNumber[31:0] which includes information for the field of Sequence_Number in the TCP header. It should be appreciated that the value for the first Ether frame is equal to the original value in the TCP header template. Furthermore, the value for the second Ether frame is equal to the value of the first frame plus the value of the payload length of the first frame, and so on.

Additionally, TCP segmentation state machine 208 also stores push and fin (finish) flags which include information for the flags of PUSH and FIN, respectively, in the TCP header. It should be appreciated that for intermediate frames, these flags are cleared. It should be further appreciated that these flags are set for the last Ether frame of the current TCP segment. TCP segmentation state machine 208 also stores the Identification (ID) field in the IP header, which is incremented for each frame. TCP segmentation state machine 208 also stores the lastFragment flag in the IP header, which is set at the last frame. It should be appreciated that the TCP segmentation state machine 208 of the present embodiment is well suited to perform segmentation for any type of transmission protocol.

Hardware queue 210 temporarily stores the descriptors and the information described above, received from TCP segmentation state machine 208. It should be appreciated that hardware queue 210 of the present embodiment is a first-in-first-out (FIFO) memory device. It should be further appreciated that hardware queue 210 can be implemented either with on-chip or off-chip memory with respect to NIC 118. One of the advantages of having hardware queue 210 located on-chip is that the restructure/segmentation process takes much less time than the off-chip alternative. Furthermore, the on-chip alternative would minimize access to the memory sub-system. It is appreciated that hardware queue 210 is coupled to data download DMA circuit 212. As such, hardware queue 210 transmits the stored information described above to data download DMA circuit 212.

With reference still to FIG. 2, data download DMA circuit 212 utilizes the descriptors to retrieve and download the data file, TCP templates, IP templates, and frame header stored within host memory 106. It should be appreciated that the templates stored within host memory 106 are reused for each segment of the data file because the structure is the same, but some information is modified later in the process and is described below. In other words, data download DMA circuit 212 receives the descriptor information from hardware queue 210 and uses it to retrieve the actual data stored within host memory 106. It is appreciated that data download DMA circuit 212 is coupled to PCI bus 102. It should be further appreciated that data download DMA circuit 212 extracts certain fields in the descriptor structure and makes them available to other modules. For example, data download DMA circuit 212 passes fragSize, last fragment, sequence number, etc. to TCP/IP header modification state machine 214, which is described in detail below.

The primary function of TCP/IP header modification state machine 214 is to insert the correct information (e.g., sequence number) into the TCP and IP template headers on-the-fly while the data is being transmitted by data download DMA circuit 212 toward a transmit (Tx) FIFO memory device 218. Specifically, TCP/IP header modification state machine 214 operates in a synchronized mode with data download DMA circuit 212. That is, when data download DMA circuit 212 starts transmitting data and TCP segmentation is enabled, TCP/IP header modification state machine 214 scans the data stream appearing at the input terminal of Tx FIFO memory device 218 and modifies on-the-fly the totalLength, dontFragment, sequenceNumber, push flag, fin flag, identification field, and lastFragment flag, which are described above with reference to TCP segmentation state machine 208. It should be appreciated that TCP/IP header modification state machine 214 alters the data fields for several locations of TCP and IP headers, which circuit implementation is described below with reference to FIG. 3. The importance of this task is to guarantee frame integrity and correct information for TCP/IP checksum circuit 216, so checksum circuit 216 can generate valid computations. It is appreciated that data download DMA circuit 212 is coupled to TCP/IP header modification state machine 214.

The TCP/IP header modification state machine 214 and data download DMA circuit 212 are each coupled to a byte packing and alignment circuit 215. It is well known that when data download DMA circuit 212 reads the data from host memory 106, the data can be located in fragments at disjointed addresses. As such, data download DMA circuit 212 transmits the data to byte packing and alignment circuit 215 in order for it to align the data into aligned words (e.g., 8 byte words). Within the present embodiment, it is appreciated that the function performed by byte packing and alignment circuit 215 is specific for the design of Tx FIFO memory device 218. In other words, byte packing and alignment circuit 215 receives data from data download DMA circuit 212 and TCP/IP modification state machine 214 and shifts the data around in order to properly align it for reception by Tx FIFO memory device 218. It should be appreciated that byte packing and alignment is well known by those of ordinary skill in the art.

Still referring to FIG. 2, checksum circuit 216 is used for providing a process of error detection for a receiver device coupled to network 120, which eventually receives the data transmitted by NIC 118. It should be appreciated that the process of checksumming is well known by those of ordinary skill in the art. Specifically, checksum circuit 216 of the present embodiment views the received data stream from byte packing and alignment circuit 215 as 16 bit integers which it sums. For example, there is a checksum on the IP header which basically checksums those 20 bytes. The checksum is a 2 byte value which is placed into a field in the IP header. Furthermore, there is a checksum calculated on a pseudo header, plus the TCP header, plus the payload. Once calculated, the checksum is placed into a field in the TCP header. The data is then transmitted to Tx FIFO memory device 218. Checksum circuit 216 is coupled between byte packing and alignment circuit 215 and Tx FIFO memory device 218. It should be appreciated that the checksum circuit 216 of the present embodiment can alternatively be coupled between Tx FIFO memory device 218 and a local memory device 220.

The Tx FIFO memory device 218 of the present embodiment receives the data from checksum circuit 216 and byte packing and alignment circuit 215 and temporarily stores it. It should be appreciated that Tx FIFO memory device 218 of the present embodiment is a first-in-first-out (FIFO) memory device. It is further appreciated that Tx FIFO memory device 218 is coupled to local memory device 220. As such, Tx FIFO memory device 218 subsequently transmits the stored data to local memory device 220 to be stored. A Medium Access Control (MAC) circuit 140 of the present embodiment is coupled to local memory device 220. MAC circuit 140 retrieves the stored data from local memory device 220 in preparation for transmitting it over network 120. It should be appreciated that MAC circuit 140 arbitrates for use of network 120 and then transmits the data over the network 120.

Figure 3:
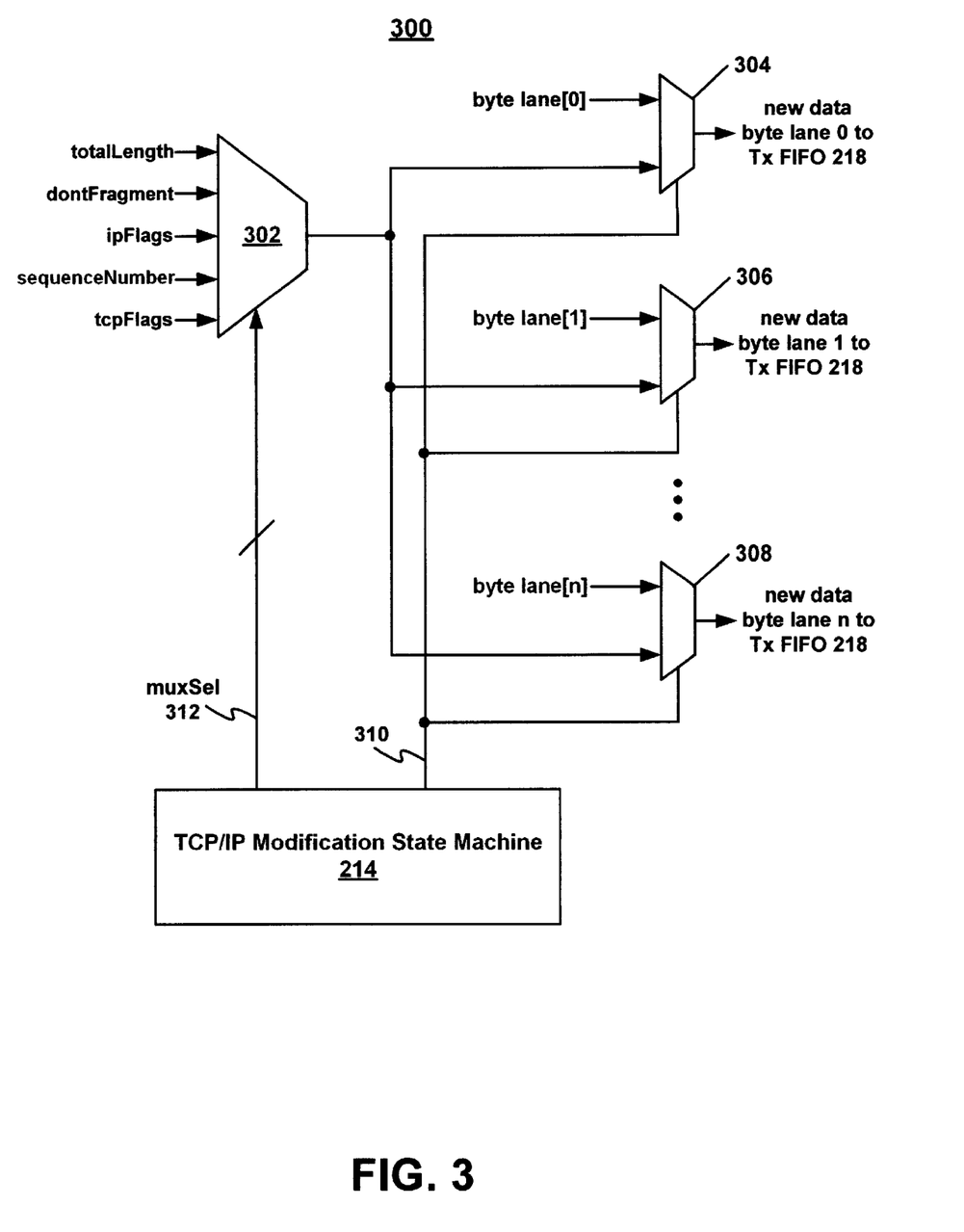
FIG. 3 is a block diagram of circuitry of the TCP/IP header modification state machine of FIG. 2 which alters the data fields of TCP and IP headers in accordance with one embodiment of the present invention.

Referring now to FIG. 3, which is a block diagram of a circuitry 300 of TCP/IP header modification state machine 214 which alters the data fields for several locations of TCP and IP headers. As previously mentioned, the importance of this task is to guarantee frame integrity and correct information for TCP/IP checksum circuit 216, so the checksum circuit 216 can generate valid computations. Specifically, multiplexer (MUX) 302 of the present embodiment of TCP/IP header modification state machine 214 receives the totalLength, dontFragment, ipFlags, sequenceNumber, and tcpFlags signals from data download DMA 212, as described above. Furthermore, MUX 302 is coupled to receive a muxSel signal 312 from other circuitry of TCP/IP header modification state machine 214. Additionally, the output of MUX 302 is coupled to an input terminal of MUXs 304-308.

In operation, circuitry 300 of TCP/IP header modification state machine 214 controls which specific information within the TCP and IP headers is corrected by asserting different values of the muxSel signal 312 to MUX 302. In this manner, a different signal (e.g., totalLength) is transmitted to the inputs of MUXs 304-308. It should be appreciated the other input terminals of MUXs 304-308 are coupled to each receive a single specific byte lane which are output by byte packing and alignment circuit 215 toward Tx FIFO memory device 218. Furthermore, other circuitry of TCP/IP header modification state machine 214 also controls the output of MUXs 304-308 by asserting a high or low signal over line 310. Therefore, TCP/IP header modification state machine 214 is able to control where the correct information is inserted into the TCP and IP headers. In this fashion, TCP/IP header modification state machine 214 outputs new byte lanes which are subsequently received by Tx FIFO memory device 218.

Figure 4:
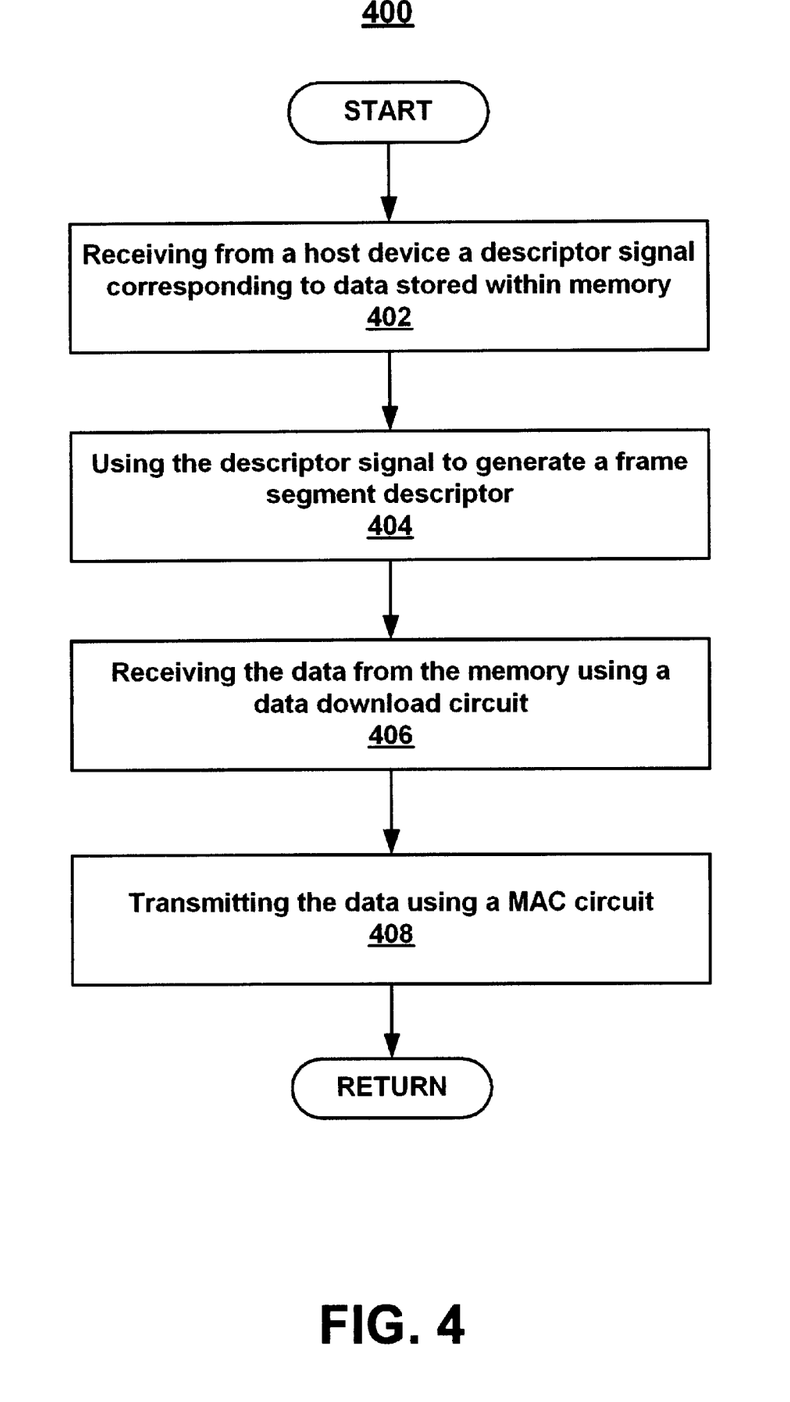
FIG. 4 is a flowchart of steps performed in accordance with one embodiment of the present invention for performing a transmission control protocol (TCP) segmentation process within hardware.

With reference to FIG. 4, a flowchart 400 of steps performed in accordance with one embodiment of the present invention for performing a transmission control protocol (TCP) segmentation process within hardware is shown. Flowchart 400 includes processes of the present invention which, in one embodiment, are carried out by a processor and electrical components under the control of computer readable and computer executable instructions. The computer readable and computer executable instructions reside, for example, in data storage features such a computer usable volatile memory 106 and/or computer usable non-volatile memory 108 of FIG. 1. Although specific steps are disclosed in flowchart 400 of FIG. 4, such steps are exemplary. That is, the present invention is well suited to performing various other steps or variations of the steps recited in FIG. 4.

In step 402 of FIG. 4, in one embodiment of the present invention, a descriptor signal which corresponds to data stored within memory is received from a host device. It should be appreciated that the host device of the present embodiment can be a computer or any other type of device.

At step 404, within the present embodiment, a segmentation circuit of a network interface face uses the received descriptor signal to generate a frame segment descriptor. It should be appreciated that the frame segment descriptor of the present embodiment can be generated using a Transmission Control Protocol (TCP) segmentation process. Furthermore, the frame segment descriptor of the present embodiment can include a Internet Protocol (IP) header and a TCP header. It should be further appreciated that step 404 is described in more specific detail below with reference to FIG. 5.

In step 406 of FIG. 4, within the present embodiment, a data download circuit receives the data from the memory. It should be appreciated that the data download circuit uses the frame segment descriptor to retrieve the data from memory.

At step 408, in one embodiment of the present invention, a Medium Access Control (MAC) circuit of the network interface card transmits the data. It should be appreciated that the MAC circuit can transmit the data over a network. After completing step 408, the present embodiment of flowchart 400 is exited.

Figure 5:
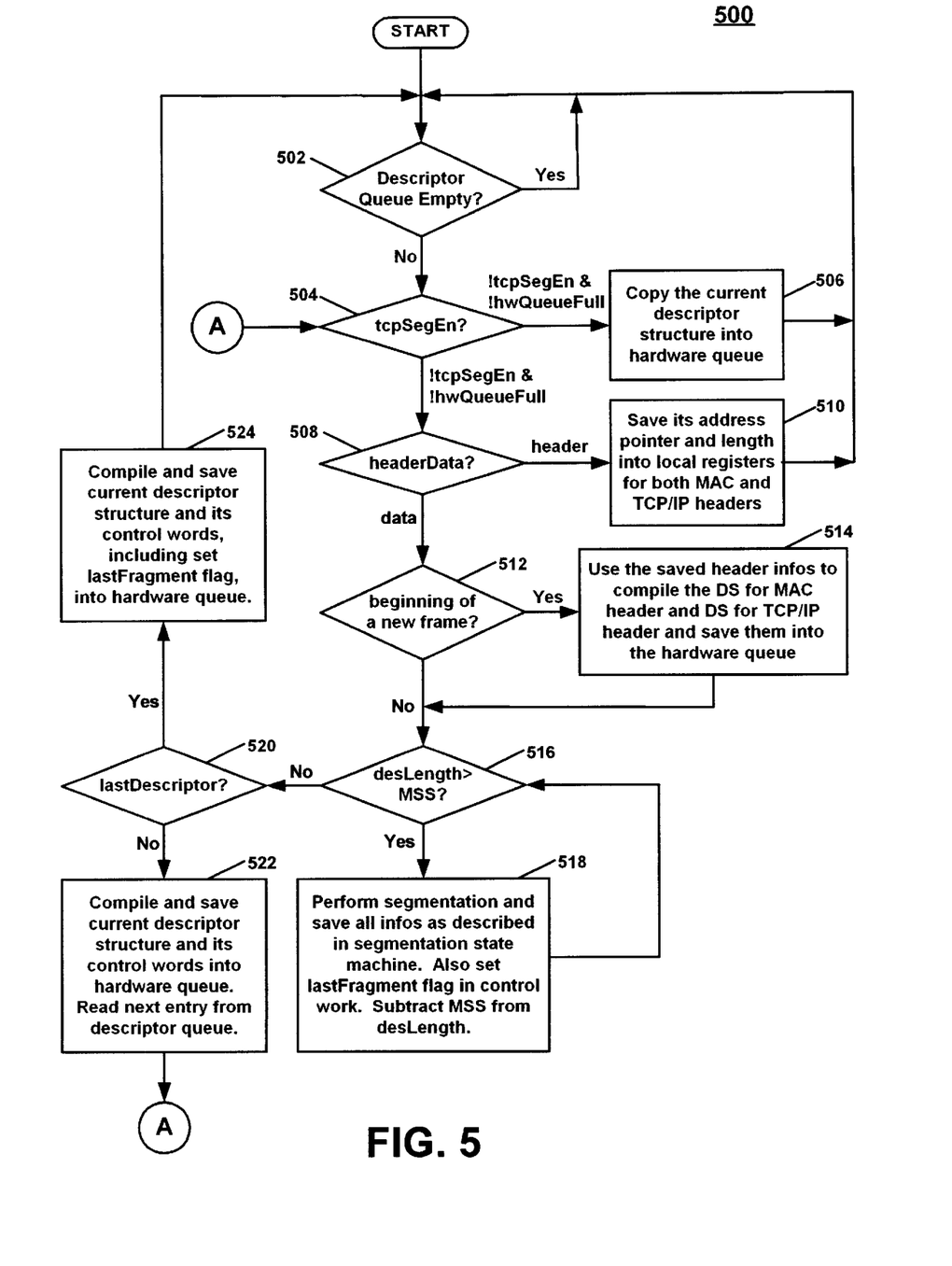
FIG. 5 is a flowchart of steps performed in accordance with one embodiment of the present invention for using a descriptor signal to generate a frame segment descriptor within hardware.

Referring now to FIG. 5, a flowchart 500 of steps performed in accordance with one embodiment of the present invention for using a descriptor signal to generate a frame segment descriptor within hardware is shown. Flowchart 500 includes processes of the present invention which, in one embodiment, are carried out by a processor and electrical components under the control of computer readable and computer executable instructions. The computer readable and computer executable instructions reside, for example, in data storage features such a computer usable volatile memory 106 and/or computer usable non-volatile memory 108 of FIG. 1. Although specific steps are disclosed in flowchart 500 of FIG. 5, such steps are exemplary. That is, the present invention is well suited to performing various other steps or variations of the steps recited in FIG. 5.

In step 502 of FIG. 5, the present embodiment determines whether a descriptor queue circuit (e.g., 206) is empty. If the descriptor queue circuit is empty, the present embodiment proceeds to the beginning of step 502. If the descriptor queue circuit is not empty, the present embodiment proceeds to step 504.

At step 504, the present embodiment determines whether a TCP segmentation enable (tcpSegEn) flag is asserted. If the tcpSegEn flag is not asserted (!tcpSegEn) and a hardware queue circuit (e.g., 210) is not full (!hwQueueFull), the present embodiment proceeds to step 506. If the tcpSegEn flag is asserted (tcpSegEn) and the hardware queue circuit is not full (!hwQueueFull), the present embodiment proceeds to step 508.

In step 506 of FIG. 5, the present embodiment copies the current descriptor structure into the hardware queue. Upon completion of step 506, the present embodiment proceeds to step 502.

At step 508, the present embodiment determines whether the current descriptor is a header descriptor or a data descriptor using a headerData flag. If the current descriptor is a header descriptor, the present embodiment proceeds to step 510. If the current descriptor is a data descriptor, the present embodiment proceeds to step 512.

In step 510, the present embodiment saves the address pointer and length of the current descriptors into local registers for both MAC and TCP/IP headers. Upon completion of step 510, the present embodiment proceeds to step 502.

At step 512 of FIG. 5, the present embodiment determines if the current descriptor is the beginning of a new frame. If the current descriptor is the beginning of a new frame, the present embodiment proceeds to step 514. If the current descriptor is not the beginning of a new frame, the present embodiment proceeds to step 516.

In step 514, the present embodiment uses the saved header information in order to compile the descriptor structure (DS) for the MAC header and the descriptor structure for the TCP/IP header, which are then saved into the hardware queue circuit. Upon completion of step 514, the present embodiment proceeds to step 516.

At step 516, the present embodiment determines whether the length of the current descriptor (desLength) is greater than the maximum segment size (MSS). If the length of the current descriptor is greater than the maximum segment size, the present embodiment proceeds to step 518. If the length of the current descriptor is not greater than the maximum segment size, the present embodiment proceeds to step 520.

In step 518 of FIG. 5, the present embodiment performs segmentation and saves all the information as described above with reference to the segmentation station machine 208 of FIG. 2. Furthermore, the present embodiment sets the lastFragment flag in the control word and also subtracts the value of the maximum segment size (MSS) from the length of the current descriptor (desLength) during step 518. Upon completion of step 518, the present embodiment proceeds to step 516.

At step 520, the present embodiment determines whether the current descriptor has the last descriptor (lastDescriptor) flag asserted indicating it is the last descriptor for the current TCP segment. If the current descriptor is the last descriptor of the current TCP segment, the present embodiment proceeds to step 524. If the current descriptor is not the last descriptor of the current TCP segment, the present embodiment proceeds to step 522.

In step 522, the present embodiment compiles and saves the current descriptor structure and its control words into the hardware queue. Furthermore, the present embodiment reads the next entry from the descriptor queue during step 522. Upon completion of step 522, the present embodiment proceeds to step 504.

At step 524, the present embodiment compiles and saves the current descriptor structure and its control words, including the set lastFragment flag, into the hardware queue. Upon completion of step 524, the present embodiment proceeds to step 502.

Thus, the present invention provides a method and system for providing significantly improved data throughput of a network connection which is used with a high speed network (e.g., gigabit levels).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit for implementing transmission control protocol segmentation, said circuit comprising:

a segmentation circuit coupled to receive a descriptor from a host device which corresponds to data, said segmentation circuit utilizes said descriptor to generate a frame segment descriptor;

a data download circuit coupled to said segmentation circuit to receive said frame segment descriptor, said data download circuit retrieves said data from a memory; and     a medium access control circuit coupled to said data download circuit to receive said data in a frame segment.

2. A circuit as described in claim 1 further comprising a retriever circuit coupled to said host device and said segmentation circuit, said retriever circuit for retrieving said descriptor from said host device.

3. A circuit as described in claim 2 wherein said retriever circuit comprises a descriptor direct memory access circuit.

4. A circuit as described in claim 1 further comprising a modification circuit coupled to said data download circuit to receive information of said frame segment, said modification circuit modifies header information within said frame segment.

5. A circuit as described in claim 1 wherein said circuit is disposed on a peripheral component.

6. A circuit as described in claim 5 wherein said peripheral component comprises a network interface card.

7. A circuit as described in claim 1 wherein said data is to be transmitted by said circuit.

8. A circuit as described in claim 1 further comprising a local memory coupled to said data download circuit and said medium access control circuit, wherein said data is stored within said local memory before being transmitted by said medium access control circuit.

9. A circuit as described in claim 1 wherein segmentation circuit performs a transmission control protocol (TCP) segmentation.

10. A circuit as described in claim 1 wherein said frame segment comprises a transmission control protocol (TCP) header.

11. A circuit as described in claim 1 wherein said frame segment comprises an internet protocol (IP) header.

12. A circuit as described in claim 1 wherein said memory is part of said host device.

13. A circuit as described in claim 1 wherein said segmentation circuit comprises a state machine.

14. A circuit as described in claim 1 wherein said data download circuit comprises a data download direct memory access circuit.

15. A system for implementing transmission control protocol segmentation, said system comprising:
    a host device comprising:
        a host driver for preparing a first signal; and
        a host memory;
    a circuit implementing transmission control protocol segmentation, said circuit comprising:
        a retriever circuit coupled to receive said first signal from said host device which indicates where a descriptor is located within said host memory, said retriever circuit retrieves said descriptor which describes data stored within said host memory;
        a segmentation circuit coupled to said retriever circuit to receive said descriptor, said segmentation circuit utilizes said descriptor to generate a frame segment descriptor;
        a data download circuit coupled to said segmentation circuit to receive said frame segment descriptor, said data download circuit retrieves said data from said host memory; and
        a medium access control circuit coupled to said data download circuit to receive said data in a frame segment.

16. A system as described in claim 15 further comprising a modification circuit coupled to said data download circuit to receive information of said frame segment, said modification circuit modifies header information within said frame segment.

17. A system as described in claim 15 wherein said host device comprises a computer.

18. A system as described in claim 15 further comprising a local memory coupled to said data download circuit and said medium access control circuit, said data is stored within said local memory.

19. A system as described in claim 15 wherein said segmentation circuit performs a transmission control protocol (TCP) segmentation.

20. A system as described in claim 15 wherein said frame segment comprises a transmission control protocol (TCP) header.

21. A system as described in claim 15 wherein said frame segment comprises an internet protocol (IP) header.

22. A system as described in claim 15 wherein said retriever circuit comprises a descriptor direct memory access circuit.

23. A system as described in claim 15 wherein said circuit is disposed on a peripheral component.

24. A system as described in claim 23 wherein said peripheral component comprises a network interface card.

25. A system as described in claim 15 wherein said data download circuit comprises a data download direct memory access circuit.

26. A method for implementing transmission control protocol segmentation within hardware, said method comprising the hardware implemented steps of:
    (a) receiving from a host device a descriptor signal which corresponds to data stored within memory;
    (b) using said descriptor signal to generate a frame segment descriptor using a segmentation circuit; and
    (c) receiving said data from said memory using a data download circuit.

27. A method for implementing transmission control protocol segmentation within hardware as described in claim 26 further comprising the step of:
    (d) transmitting said data using a medium access control circuit.

28. A method for implementing transmission control protocol segmentation within hardware as described in claim 27 wherein said step (d) comprises:
    transmitting said data using said medium access control circuit, wherein said medium access control circuit is disposed on a peripheral component.

29. A method for implementing transmission control protocol segmentation within hardware as described in claim 27 wherein said step (d) comprises:
    transmitting said data using said medium access control circuit, wherein said medium access control circuit is disposed on a network interface card.

30. A method for implementing transmission control protocol segmentation within hardware as described in claim 26 wherein said step (a) comprises:
    receiving from said host device said descriptor signal, wherein said host device comprises a computer.

31. A method for implementing transmission control protocol segmentation within hardware as described in claim 26 wherein said step (b) comprises:
    using said descriptor signal to generate said frame segment descriptor, wherein said frame segment descriptor comprises a transmission control protocol (TCP) header.

32. A method for implementing transmission control protocol segmentation within hardware as described in claim 26 wherein said step (b) comprises:
    using said descriptor signal to generate said frame segment descriptor, wherein said frame segment descriptor comprises an internet protocol (IP) header.

33. A method for implementing transmission control protocol segmentation within hardware as described in claim 26 wherein said step (b) comprises:
    using said descriptor signal to generate said frame segment descriptor, wherein said frame segment descriptor is generated using a transmission control protocol (TCP) segmentation process.

* * * * *

UNITED STATES PATENT AND TRADEMARK OFFICE
CERTIFICATE OF CORRECTION

PATENT NO.    : 6,526,446 B1
DATED         : February 25, 2003
INVENTOR(S)   : Li-Jau, Rich Traber and Chi-Lie Wang It is certified that error appears in the above-identified patent and that said Letters Patent is hereby corrected as shown below:

<u>Title page,</u>
Item [75], should read:
-- [75] Inventors:   Li-Jau, San Jose, CA (US); Rich Traber, Fremont, CA (US);
                     Chi-Lie Wang, San Jose, CA (US) --

Signed and Sealed this

Twenty-third Day of December, 2003

JAMES E. ROGAN
*Director of the United States Patent and Trademark Office*